United States Patent [19]
Ingerslev

[11] 3,856,053
[45] Dec. 24, 1974

[54] PIPELINE STRUCTURE

[75] Inventor: Eric Ingerslev, Guernsey (Channel Is.)

[73] Assignee: Island International Engineers Limited, Guernsey, Channel Islands

[22] Filed: Apr. 23, 1973

[21] Appl. No.: 353,537

[30] Foreign Application Priority Data
Dec. 1, 1972   Great Britain..................... 55708/72

[52] U.S. Cl................... 138/153, 138/149, 138/172
[51] Int. Cl................................................ F16l 9/14
[58] Field of Search ........... 138/153, 143, 144, 141, 138/127, 172, 149, 140

[56] References Cited
UNITED STATES PATENTS
| | | | |
|---|---|---|---|
| 3,002,534 | 10/1961 | Noland | 138/141 |
| 3,058,493 | 10/1962 | Muller | 138/122 |
| 3,540,486 | 11/1970 | Flounders | 138/127 X |
| 3,603,719 | 9/1971 | Lejune | 138/127 |

*Primary Examiner*—Richard C. Queisser
*Assistant Examiner*—Daniel M. Yasich
*Attorney, Agent, or Firm*—Larson, Taylor & Hinds

[57] ABSTRACT

A large diameter, high pressure pipeline has an internal membrane of snythetic plastic and a set of longitudinal wires extend in parallel contacting relation to each other along the outer surface of the membrane. A coiled wire is wound spirally around the longitudinal wires, the coils contacting each other. A layer of heat insulating material covers the coiled wire, and a protective outer shell of synthetic plastic covers the heat insulating layer.

3 Claims, 2 Drawing Figures

PATENTED DEC 24 1974　　　　　　　　　　3,856,053

PIPELINE STRUCTURE

This invention relates to new and useful improvements in the construction of pipelines, conduits, and the like, and more particularly, although not exclusively, the invention concerns itself with the structure of pipelines having a large diameter, on the order of 36 inches or more, which are capable of withstanding high internal fluid pressures, of either liquid or gas, of at least 25 atmospheres (350 lbs./sq.in.) and higher.

The principal object of the invention is to provide a pipeline structure of the large diameter, high pressure type as above outlined, which is relatively simple in construction, posseses inherent resiliency to facilitate expansion within safe limits, and lends itself to economical manufacture.

Figure 1:
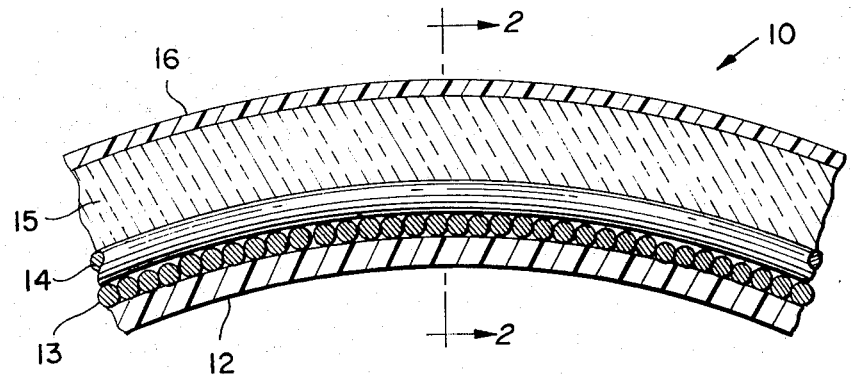
Figure 2:
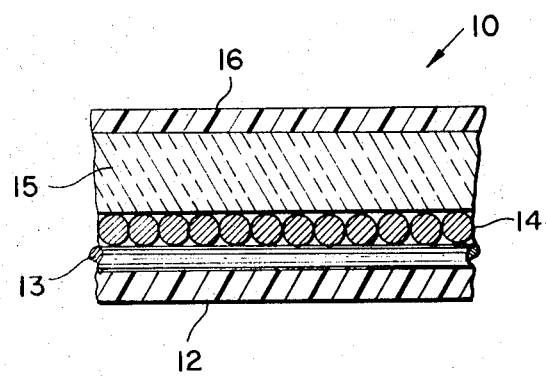

With the foregoing more important object and features in view, and such other objects and features which may become apparent as this specification proceeds, the invention will be understood from the following description taken in conjunction with the accompanying drawings, wherein like characters of reference are used to designate like parts, and wherein, for illustrative purposes:

FIG. 1 is a fragmentary cross-sectional view of a pipeline in accordance with the invention; and FIG. 2 is a fragmentary longitudinal sectional view, taken substantially in the plane of the line 2—2 in FIG. 1.

Referring now to the accompanying drawings in detail, the pipeline structure of the invention is designated generally by the reference numeral 10. As already noted, the pipeline is of a large diameter, on the order of 36 inches or more, although the teachings of the invention may be applied to pipelines of smaller sizes.

The pipeline 10 comprises an internal tubular membrane 12 of synthetic plastic material such as polyvinyl chloride. A set of longitudinal wires 13 extend along the outer surface of the membrane 12 in parallel juxtaposed contacting relation with each other, as will be apparent from FIG. 1.

A coiled wire 14 is wound spirally around the longitudinal wires 13, with the coils thereof in contact with each other, as shown in FIG. 2.

The longitudinal wires 13 and the coiled wire 14 preferably consist of wire of the type commonly used as pre-stressing wire in concrete. However, the wires 13, 14 are not pre-stressed and have a strength ranging upwards from 100t/sq.in.

The coiled wire 14 is covered by a tubular layer 15 of heat insulating material such as Polyurethane or cork. Finally, the insulating layer 15 is covered by a protective, tubular outer shell 16 of synthetic plastic material such as tough polyvinyl chloride.

The pipeline of the invention is capable of withstanding internal fluid pressures, of either liquid or gas, of at least 25 atmospheres (350 lbs/sq.in) and higher. The inner membrane 12 and the outer shell 16 are fluid-impervious, and the inner membrane posseses sufficient inherent resiliency to permit expansion within safe limits when the pipeline is subjected to internal pressure. The rupture strength of the inner membrane may not be sufficient to withstand expected pressures, but the wires 13 and 14 effectively reinforce the inner membrance and prevent rupture thereof. Since the wires are not pre-stressed, they also possess inherent resiliency for expansion with the membrane, but only within safe limits.

The outer shell 16 effectively protects the pipeline against effects of moisture, humidity, as well as physical damage.

Due to the relative modulus of elasticity or resilience of the wires and of the synthetic plastic layers, the latter will not be over-stressed, the tension under pressure being absorbed by the coiled wire 14.

While in the foregoing there has been described and shown the preferred embodiment of the invention, various modifications and equivalents may be resorted to, within the spirit and scope of the invention as claimed.

The embodiments of the invention in which an exclusive property or privilege is claimed are defined as follows:

1. In a high pressure pipeline structure having a diameter of at least about 36 inches, the combination of an internal cylindrical membrane of synthetic plastic material, a set of longitudinal steel rods extending along the outer surface of said membrane in parallel juxtaposed contacting relation with each other, and substantially parallel to the longitudinal axis of the internal cylindrical membrane, a coiled rod wound spirally around said longitudinal rods with the coils thereof in contact with each other, a tubular layer of heat insulating material covering said coiled rods, and a tubular outer shell of synthetic plastic material covering said heat insulating layer, said longitudinal rods and said coiled rod consisting of rod having a strength of at least about 100 tons per square inch and commonly used as pre-stressed rod in concrete, said rods in said pipeline structure being not prestressed.

2. The structure as defined in claim 1 wherein said insulating material is selected from a group consisting of Polyurethane and cork.

3. The structure as defined in claim 1 wherein said internal membrane and said outer shell comprise polyvinyl chloride.

* * * * *